United States Patent [19]
Tiemeyer et al.

[11] Patent Number: 5,782,265
[45] Date of Patent: Jul. 21, 1998

[54] FILTRATION AND TRANSPORTABLE CONTAINER FOR PROCESSING WASTE INTO FUEL

[76] Inventors: Eric B. Tiemeyer, 3165 Timberview, Dallas, Tex. 75229; Kenneth R. Latchem, P.O. Box 382635, Duncanville, Tex. 75138

[21] Appl. No.: 578,467

[22] Filed: Dec. 26, 1995

[51] Int. Cl.⁶ ............................................ F16K 51/00
[52] U.S. Cl. .................... 137/550; 137/347; 137/565; 137/585
[58] Field of Search ...................... 137/550, 565, 137/267, 585, 351, 347

[56] References Cited

U.S. PATENT DOCUMENTS

| | | | |
|---|---|---|---|
| 1,801,750 | 4/1931 | McEachren | 137/267 |
| 4,525,277 | 6/1985 | Poulin | 137/267 |
| 5,366,520 | 11/1994 | Tiemeyer | 210/694 |
| 5,474,101 | 12/1995 | Wright et al. | 137/565 |
| 5,553,639 | 9/1996 | Erickson | 137/347 |

*Primary Examiner*—A. Michael Chambers
*Attorney, Agent, or Firm*—John E. Vandigriff

[57] ABSTRACT

The invention is to a method and apparatus that provide a removable container that functions both as a filtration unit and as a removable and transportable container for transferring fuel from a Filtration Fuel Technology (FFT) process to a fuel receiving facility.

16 Claims, 7 Drawing Sheets

FILTRATION AND TRANSPORTABLE CONTAINER FOR PROCESSING WASTE INTO FUEL

FIELD OF THE INVENTION

This invention relates to filtration fuel technology, and more particularly to a filtration and transportable container for processing waste material into fuel.

CROSS REFERENCE

U.S. Pat. No. 5,366,520, issued Nov. 22, 1994, entitled FILTRATION FUEL APPARATUS AND METHOD

BACKGROUND OF THE INVENTION

Certain hazardous wastes generated by the petroleum industry are emulsified mixtures of solids, water, and oil that are extremely difficult to treat, transport, and dispose. These wastes, in their original state, cannot be directly used as a fuel without considerable dewatering, nor can they be feasibly transported in conventional liquids tankers due to their high solids content. Costs associate with dewatering, transporting, and disposing of these wastes have become very burdensome to the petroleum refining industry. An apparatus and process of filtration is disclosed and claimed in U.S. Pat. No. 5,366,520. The apparatus in this patent is a converted tanker truck in which fixed tanks are used to process and transport the processed mixtures. The tanks are fixed in that they cannot be removed from the tanker truck, and the processed material has to be removed from the tanker in order for the tanker to process and transport more material.

SUMMARY OF THE INVENTION

The invention is to a method and apparatus that provide a removable container that functions both as a filtration unit and as a removable and transportable container for transferring fuel from a Filtration Fuel Technology (FFT) process to a fuel receiving facility.

The container, referred to as fuel tote, is filled with a hydrophobic filtration media and then placed into the FFT transport tanker. The fuel tote docks with the FFT transport tanker which is equipped with retractable, spark resistant, rolling spacers that serve as stabilizers and ensure that the tote can be easily removed from the tanker. The fuel tote is designed to be a stand-alone vacuum pressure vessel. An air-tight sealable lid is attached at the top of the tote by a single heavy-duty hinge. This hinge can be equipped with a hydraulic lift to open and close the lid. The lid is sealed in place by several pull-down fasteners. The lid is also equipped with a pumpable waste distribution system that connects to the FFT transport tanker via a dripless quick-connect coupling. The bottom of the tote connects to the pneumatic pressure system of the FFT transport tanker with two quick connect couplings. The bottom cone of the tote is equipped with a removable filter pad/screen which holds the hydrophobic media in place while allowing extracted water to be removed from the process. The exit of the cone is equipped with a valve that prevents fuel leakage during transport.

Once the fuel tote is docked and properly connected to the FFT transport tanker, a vacuum is produced by the FFT transport tanker to draw the pumpable petroleum contaminated wastes through the hydrophobic filtration media. The hydrophobic filtration media captures the oil and solids while separating the water constituent from the waste via pneumatic vacuum pressure. When the hydrophobic media has become saturated, the waste flow into the fuel tote and the pneumatic pressure for water extraction are discontinued. The fuel tote can then be disconnected and removed from the FFT tanker truck and loaded on another truck or rail car for transport to the fuel receiving facility, or the fuel tote can be transported to the fuel receiving facility with the FFT transport tanker. The fuel totes can be easily emptied at the fuel receiving facility by inverting the fuel tote and opening the large single-hinged lid on the tote.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
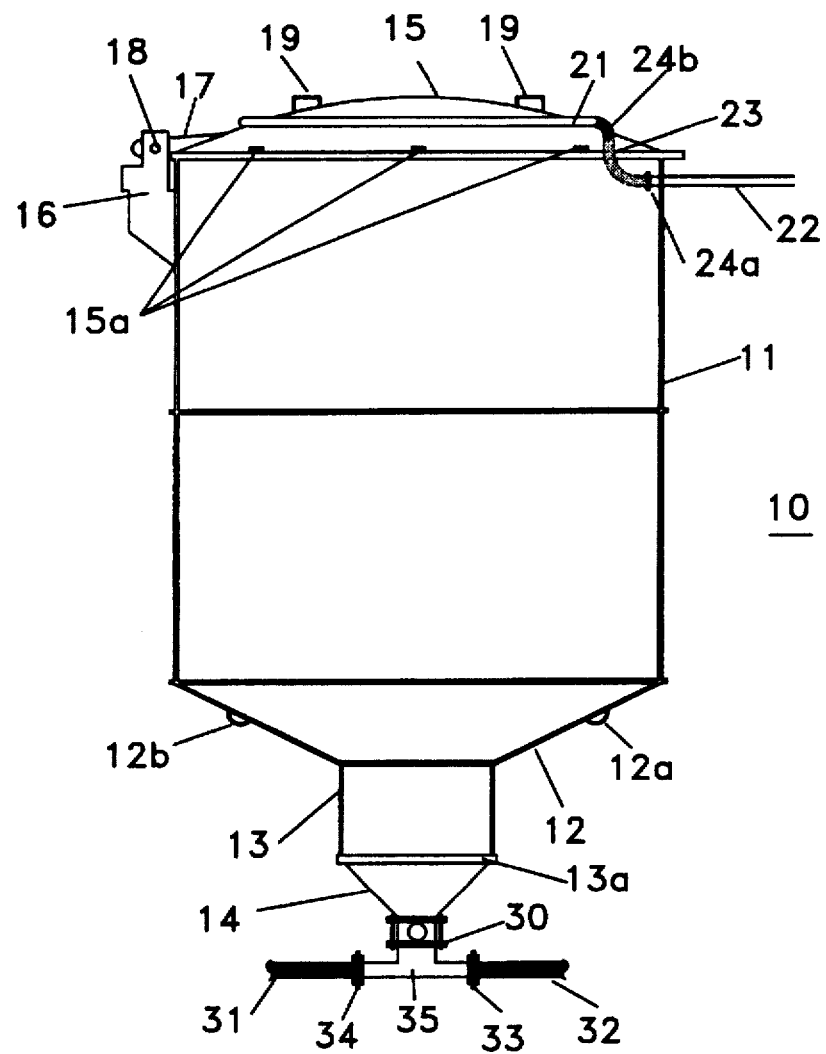
FIG. 1 is a side view of the fuel tote of the invention.

FIG. 1 is a side view of the fuel tote 10. Fuel tote 10 has a cylindrical body 11 with a transition region 12 which ends in a smaller cylindrical body 13. Below body 13 is a discharge hopper 14 separated from body 13 by a removable filter screen 13a. Discharge valve 30 allows the removal of water and other liquids drained from the waste material placed in fuel tote 10. A vacuum pump connected to line 32 pulls a vacuum on fuel tote 10. As waste material is introduced into fuel tote 10 through liquid waste distribution piping ring 21, the vacuum system assists in pulling the waste material across the hydrophobic fuel material bed. Air and water flow through valve 30 and pipe 35 connected to tube 32 by quick disconnect 33. Tube 31 is connected to pipe 35 by quick disconnect coupler 34, and tube 32 is connected to pipe 35 by quick disconnect coupler 33.

Fuel tote 10 contains a fibrous hydrophobic filter material which retains oil and solids, but allows water to flow through to the bottom of bodies 11 and 13 to be discharged through valve 30.

The waste material is pumped into fuel tote 10 via pipe 22 mounted on the carrier of fuel tote 10 as described below. The pumped material flows from pipe 22 to flexible tube 23 which is connected to pipe 22 with a quick disconnect coupler 24a. Flexible tube 23 is connected to pipe 21 by quick disconnect coupler 24b.

Pipe 21 is shown mounted on the top of lid 15, but may be mounted internal to the fuel tote. The waste material is carried into fuel tote 10 by pipe 21. Lid 15 is hinged to body 11 by a hinge made up of part 16 which is rigidly attached to body 11, part 17 which is rigidly attached to lid 15 and to pivot pin 18 which allows lid 15 to open allowing the filtered waste material to be removed from fuel tote 10. Lid 15 is secured to body 11 by plurality of lid locks 15a which are arranged around lid 15, and seals to body 11 with a pressure/vacuum tight seal. When lid 15 is to be opened, either quick disconnect 24a or 24b is uncoupled from pipe 22 or 21, respectively.

To remove the filter material from fuel tote 10, fuel tote 10 is removed from its carrier (FIGS. 3 & 4) by lifting fuel tote 10 by lifting lugs 19 (there are four spaced around lid 15 and placed in a holder (not illustrated in FIG. 1).

Transistion region 12 has a plurality of lifing lugs 12a positioned around its surface for lifting fuel tote in an inverted position to allow removal of the filter material from within fuel tote 10 when lid 15 is opened.

Figure 2:
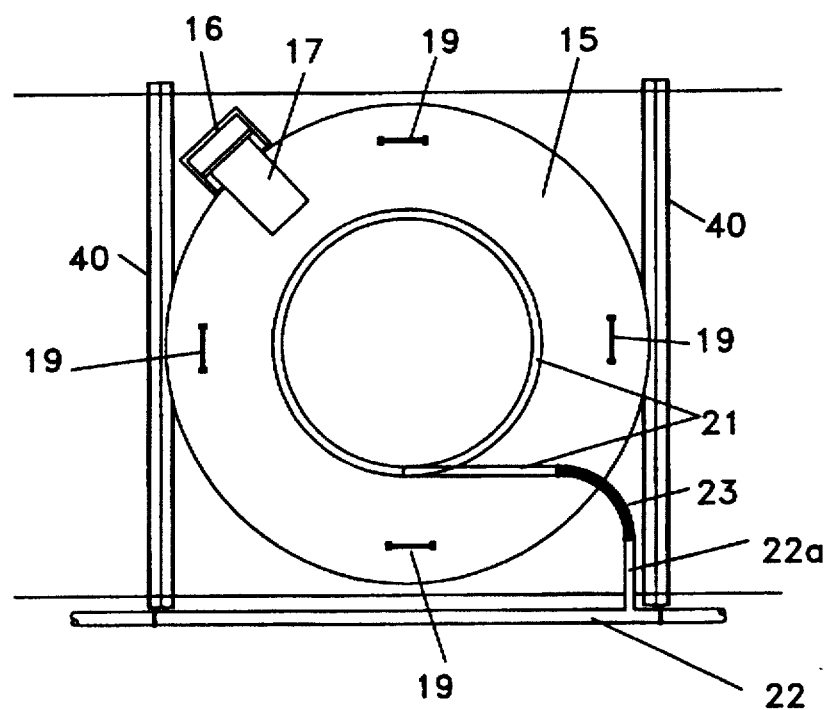
FIG. 2 is a top view of the invention.

FIG. 2 is a top view of fuel tote 10 showing lid 15 with lifting lugs 19 placed around the edges of lid 15. Distribution pipe 21 is shown in a circle around the top of lid 15 and is attached to flexible tube 23 which is attached to pipe 22a, a part of pipe 22 extending along the length of a trailer which carries several fuel totes. Cross frames 40 are a part of the trailer which carries the fuel totes.

Figure 3:
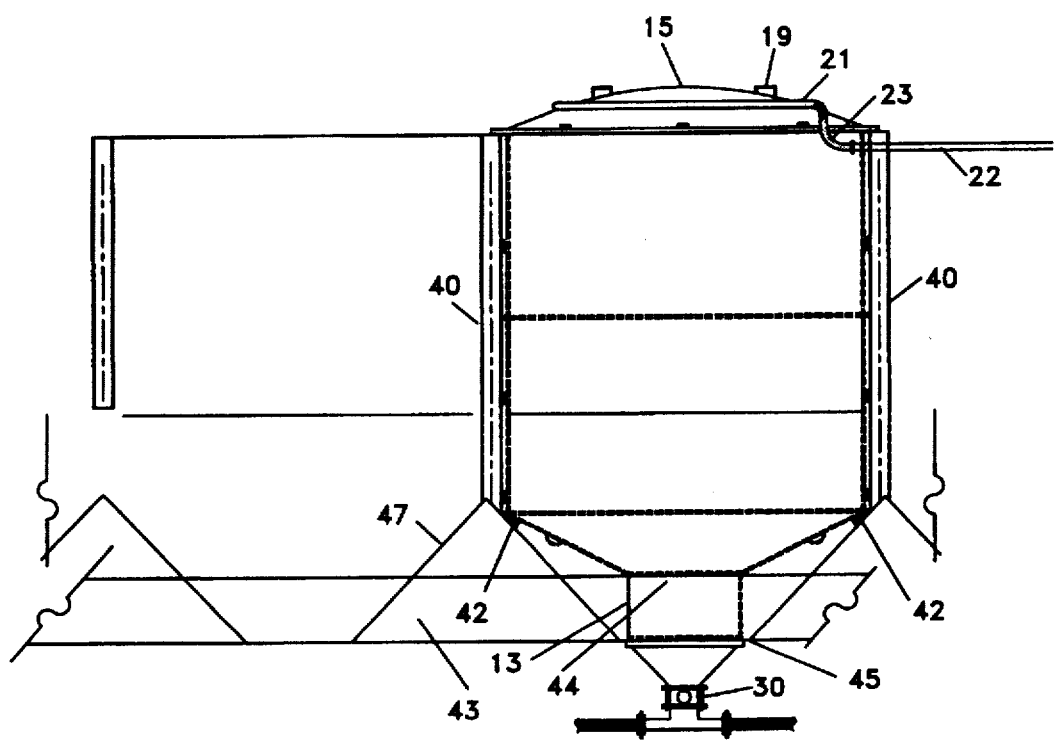
FIG. 3 shows the fuel tote mounted in a partial view of a trailer.

FIG. 3 shows a portion of a trailer used to transport fuel totes 10. A main support beam 43 for the trailer has openings 44 and 45 through which body 13 of tote 10 is placed to support tote 10. Support bars 40 support a fuel tote 10 in place during the transportation of the fuel tote. A plurality of spacers 42 are positioned around exterior shell 47 where fuel tote 10 comes into contact with exterior shell 47. Spacers 42 may be of a semi-flexible material to aid in reducing vibration of fuel tote 10 while it is being transported.

Figure 4:
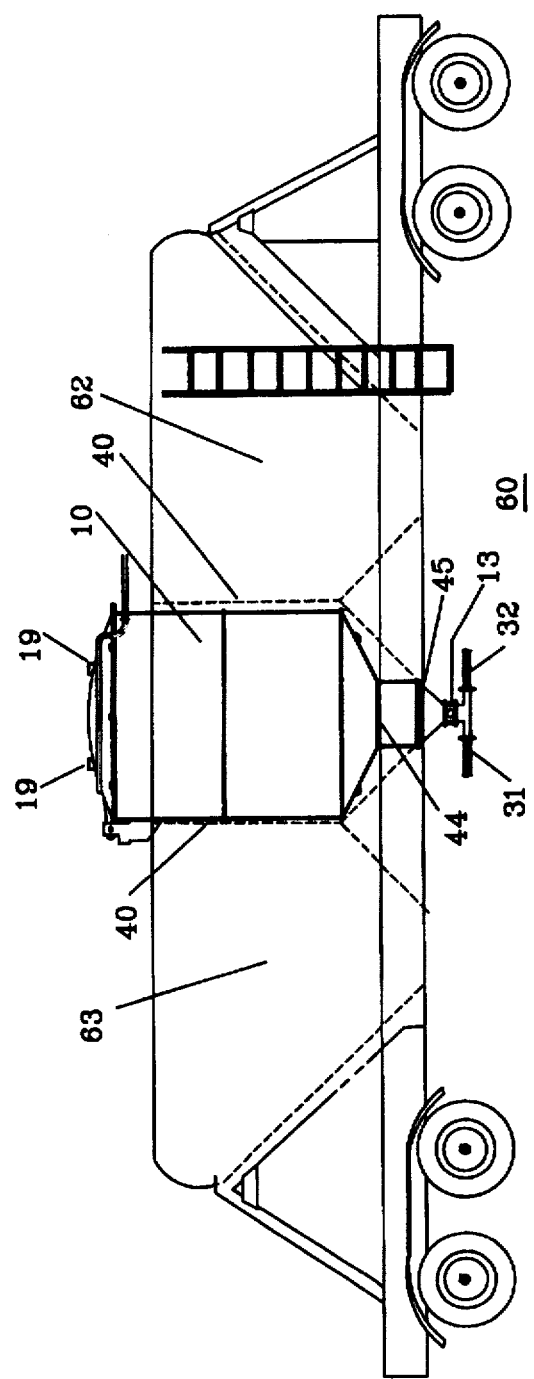
FIG. 4 shows an example of a trailer in which a fuel tote may be mounted.

FIG. 4 shows an example of a trailer 60 in which several fuel totes 10 may be mounted. Fuel tote 10 is mounted in a compartment defined by supports 40. The lower end of fuel tote 10 and particularly body 13 extends through openings 44 and 45 in main support beam 43. Two additional fuel totes 10 (not illustrated) may be placed in compartments 62 and 63. The flexible tubes 31 and 32 are connected to the adjacent fuel totes. Each fuel tote is placed in or removed from trailer 60 by lift lugs 19.

Figure 5:
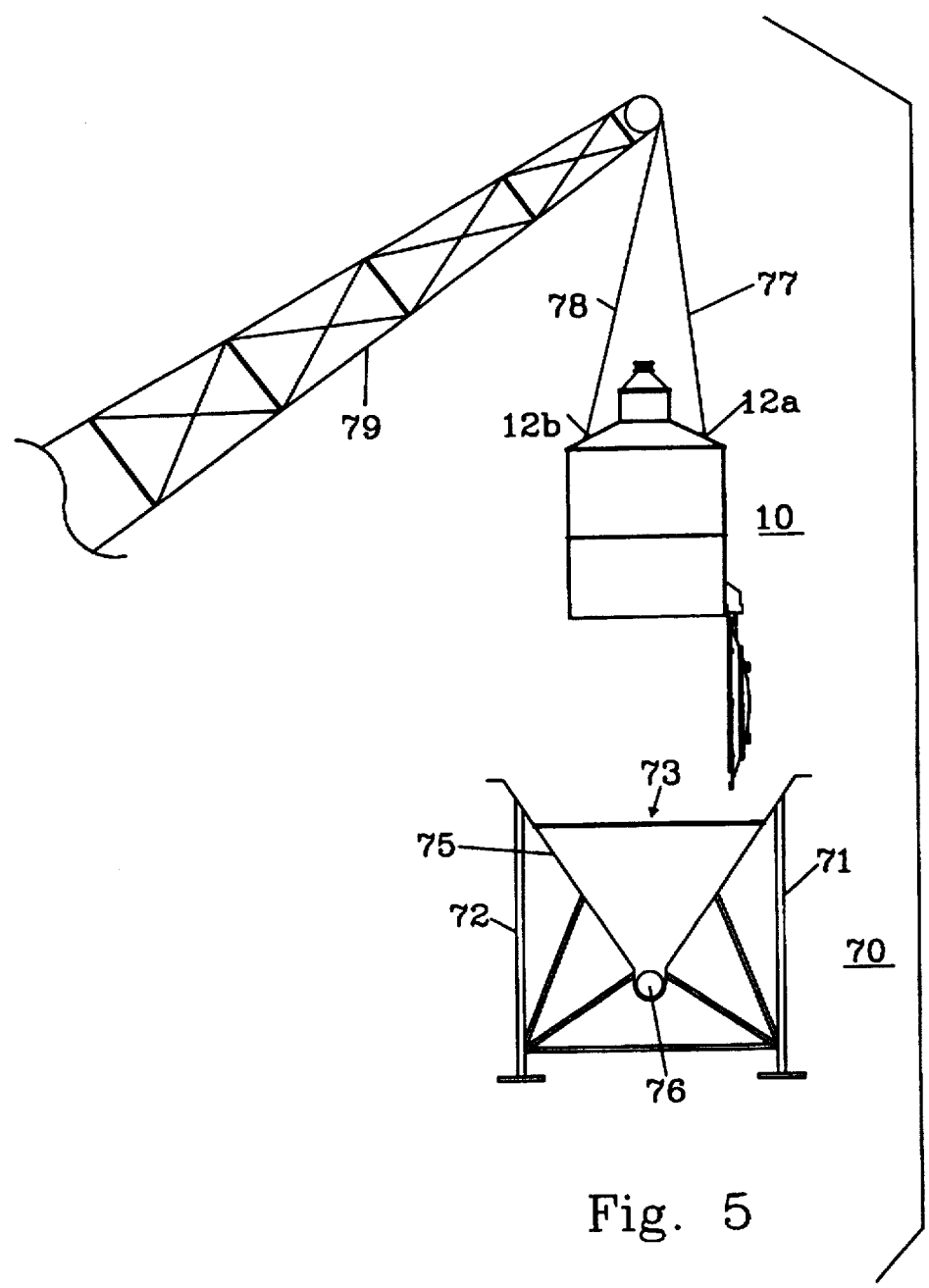
FIG. 5 shows a fuel tote being emptied into a receiving hopper.

FIG. 5 shows a fuel tote 10 that is suspended by a crane or lift mechanism 79, suspending tote 10 above a receiving hopper 70. Lid 15 is open allowing the contents of hopper 10 to be emptied into hopper 70. Hopper 70, for example is supported by side frames 71 and 72 and has a tapered receiving chamber 73 having sloped sides 75 which terminate in an outlet 76 through which the waste material may be removed. Fuel tote is attached to crane cables 77 and 78 by lifting lugs 12a and 12b.

Figure 6:
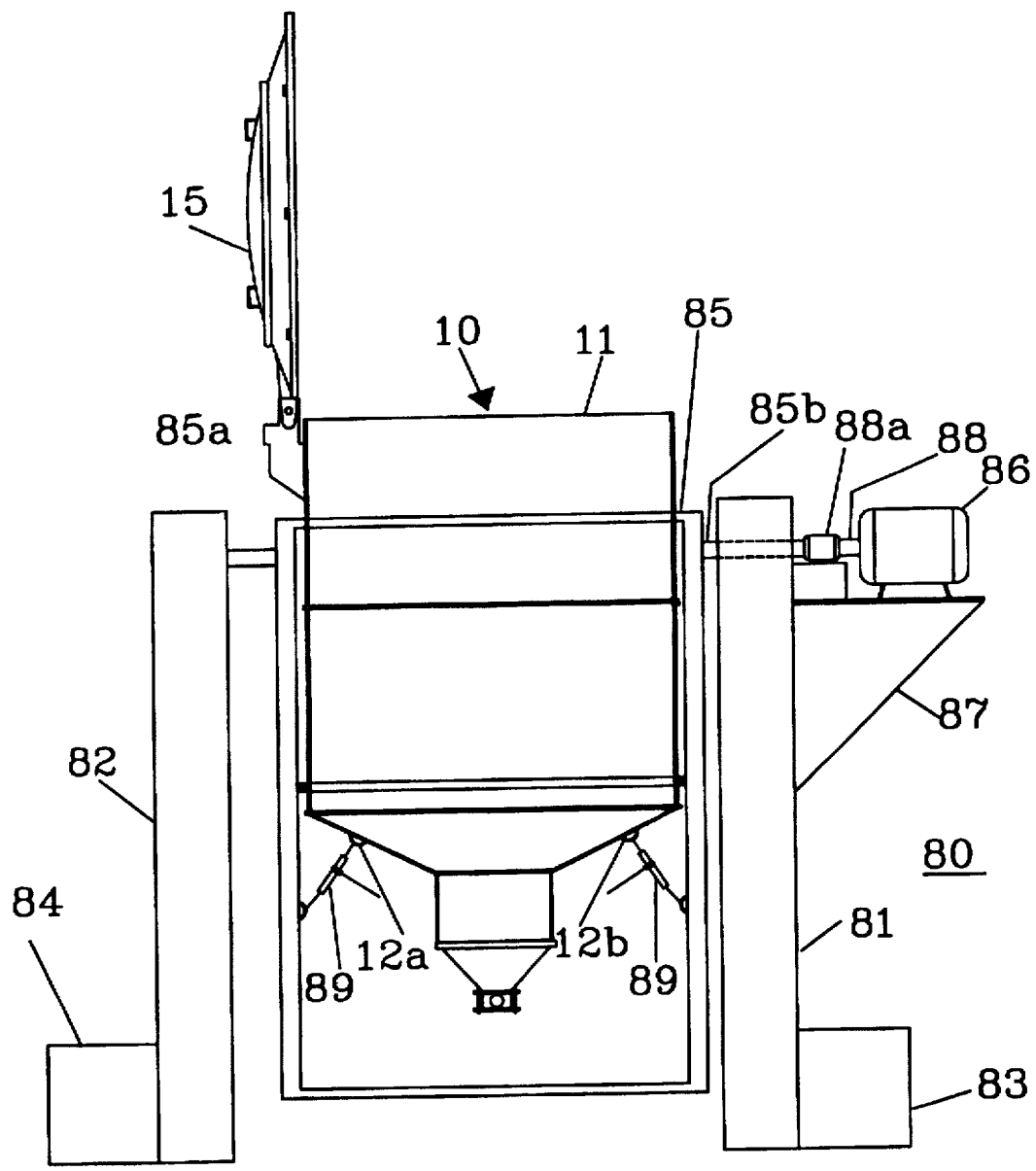
FIG. 6 shows a fuel tote in a fuel tote support with the lid open.

Fuel tote 10 may be stored in a carrier for filling and for emptying. FIG. 6 shows carrier 80 in which the body 11 of a fuel tote 10 is supported in a frame 85. Frame 85 is supported by legs 81 and 82 attached to feet 83 and 84, respectively. Frame 85 is rotatably mounted to legs 81 and 85 by shafts 85a and 85b. Shaft 85b is coupled to motor 86 through coupler 88a and motor shaft 88. Motor 86 is supported on platform 87 mounted on the side of leg 81. Fuel tote 10 is secured in frame 85 by tie-down ratchets 89, which are attached to lifting lugs 12a and 12b to secure tote 10 within frame 85.

Figure 7:
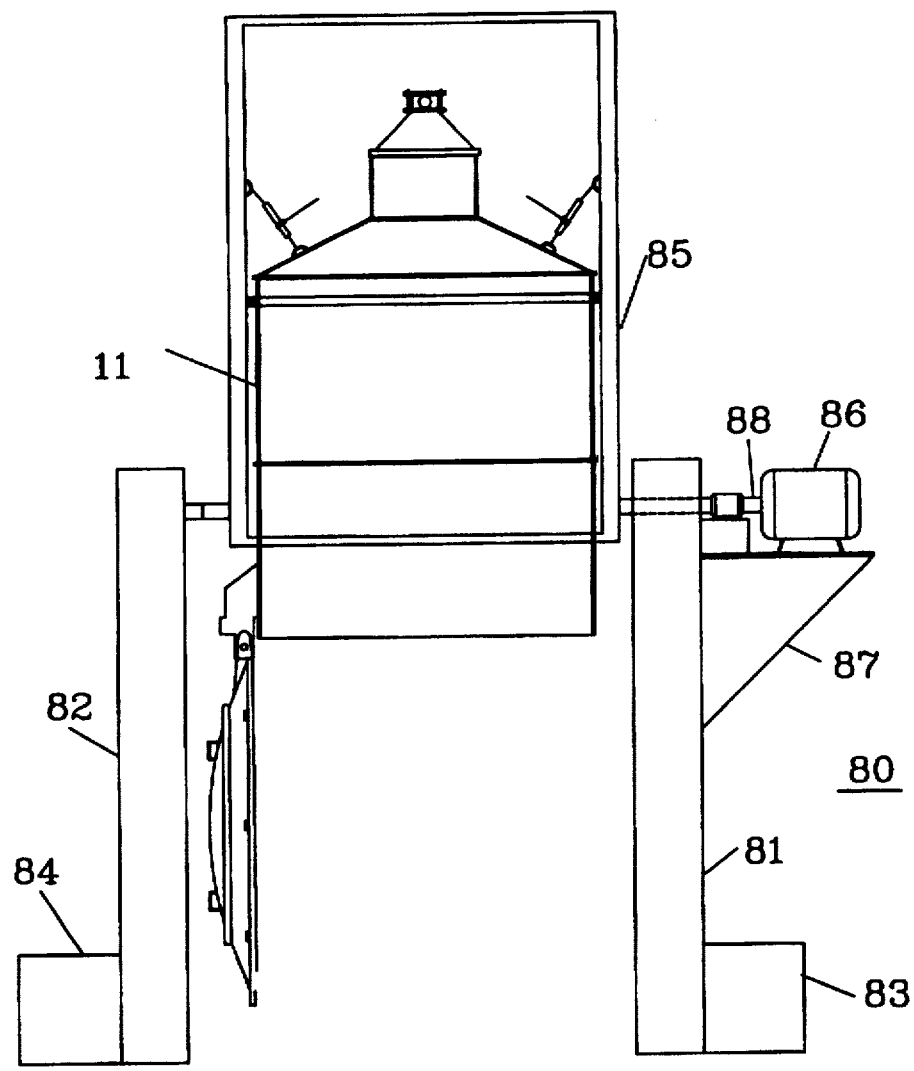
FIG. 7 shows a fuel tote inverted in the fuel tote support to empty the fuel tote.

FIG. 7 shows fuel tote 10 inverted by rotating frame 85 180 degrees. By rotating Fuel Tote 180 degrees, the contents of the fuel tote may be removed. Carrier 80 may be positioned over a dump station (not illustrated), or moved there when the contents of fuel tote 10 are to be removed. Carrier 80 may include wheels (not illustrated) or may be lifted from one place to another by a crane or other lifting device.

What is claimed:

1. A removable and transportable container for transferring fuel from a Filtration Fuel Technology process to a fuel receiving facility, comprising:

a first cylindrical body;

a second smaller cylindrical body;

a first transition region between and connecting said first and second cylindrical bodies;

a second transition region attached to said second cylindrical body on a side of said second cylindrical body opposite said first transition region; and a discharge valve attached to said second transition region; and a hinged lid enclosing an end of said first cylindrical body opposite an end connected to said first transition region.

2. The container according to claim 1, including a circular input pipe mounted on said lid for introducing material into said container.

3. The container according to claim 1, including a filter between said second transition region and said second cylindrical body.

4. The container according to claim 1, in combination with a hydrophobic filter material for filtering waste introduced into the container.

5. The container according to claim 1, wherein said lid is hinged at one side of said first cylindrical body, and said lid has at least two lifting lugs thereon.

6. The container according to claim 1, wherein said first transition region has at least two lifting lugs thereon.

7. The container according to claim 1, wherein said discharge valve has connections for pulling a vacuum to remove water from the container.

8. A removable and transportable container for transferring fuel from a Filtration Fuel Technology process to a fuel receiving facility, comprising:

a first cylindrical body;

a second cylindrical body;

a first transition region between and connecting said first and second cylindrical bodies;

a second transition region attached to said second cylindrical body on a side of said second cylindrical body opposite said first transition region; and a discharge valve attached to said second transition region;

a lid enclosing an end of said first cylindrical body opposite an end connected to said first transition region; and a circular input pipe mounted on said lid for introducing material into said container.

9. The container according to claim 8, including a filter between said second transition region and said second cylindrical body.

10. The container according to claim 8, wherein said container holds a hydrophobic filter material for filtering waste introduced into the container.

11. The container according to claim 8, wherein said lid is hinged at one side of said first cylindrical body, and said lid has at least tow lifting lugs thereon.

12. The container according to claim 8, wherein said first transition region has at least two lifting lugs thereon.

13. The container according to claim 8, wherein said discharge valve has a connection for pulling a vacuum to remove water from the container.

14. A removable and transportable container for transferring fuel from a Filtration Fuel Technology process to a fuel receiving facility in combination with a container carrier, comprising:

a first cylindrical body;

a second cylindrical body;

a first transition region between and connecting said first and second cylindrical bodies;

a second transition region attached to said second cylindrical body on a side of said second cylindrical body opposite said first transition region; and a discharge valve attached to said second transition region;

a lid enclosing an end of said first cylindrical body opposite an end connected to said first transition region;

a support frame;

a rotatable frame in said carrier for holding said carrier including said cylindrical bodies; and a motor for rotating said frame.

15. A removable and transportable container for transferring fuel from a Filtration Fuel Technology process to a fuel receiving facility in combination with a container carrier, comprising:

a first cylindrical body;

a second cylindrical body;

a first transition region between and connecting said first and second cylindrical bodies;

a second transition region attached to said second cylindrical body on a side of said second cylindrical body opposite said first transition region; and a discharge valve attached to said second transition region;

a lid enclosing an end of said first cylindrical body opposite an end connected to said first transition region;

a support frame;

a rotatable frame in said carrier for holding said carrier including said cylindrical bodies; and a motor for rotating said frame.

16. The combination according to claim 14, wherein said frame is mounted to said carrier by rotatable shafts, one of which is rotated by a motor.

* * * * *